(12) United States Patent
Zhang et al.

(10) Patent No.: US 10,057,901 B2
(45) Date of Patent: Aug. 21, 2018

(54) RESOURCE ALLOCATION METHOD AND RESOURCE ALLOCATION DEVICE

(71) Applicant: Yulong Computer Telecommunication Scientific (Shenzhen) Co., Ltd., Shenzhen, Guangdong (CN)

(72) Inventors: Chenlu Zhang, Guangdong (CN); Yunfei Zhang, Guangdong (CN); Yiqing Cao, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 77 days.

(21) Appl. No.: 15/346,404

(22) Filed: Nov. 8, 2016

(65) Prior Publication Data

US 2017/0055257 A1 Feb. 23, 2017

Related U.S. Application Data

(63) Continuation-in-part of application No. PCT/CN2014/095932, filed on Dec. 31, 2014.

(30) Foreign Application Priority Data

May 9, 2014 (CN) .......................... 2014 1 0195864

(51) Int. Cl.
H04W 72/04 (2009.01)
H04W 16/14 (2009.01)

(52) U.S. Cl.
CPC ....... *H04W 72/0446* (2013.01); *H04W 16/14* (2013.01); *H04W 72/04* (2013.01); *H04W 72/0453* (2013.01)

(58) Field of Classification Search
CPC . H04W 72/04; H04W 16/14; H04W 72/0446; H04W 72/0453

(Continued)

(56) References Cited

U.S. PATENT DOCUMENTS 7,020,471 B2 * 3/2006 Bing .................... H04B 7/2612
370/321
8,396,498 B2 * 3/2013 Harada ................. H04W 16/14
455/447

(Continued)

FOREIGN PATENT DOCUMENTS

CN 101291515 A 10/2008
CN 101784056 A 7/2010

(Continued)

OTHER PUBLICATIONS

"Introducing LTE in Unlicensed Spectrum", 3GPP Draft; RP-131635 LTE in Unlicensed Spectrum, 3rd Generation Partnership Project (3GPP), Mobile Competence Centre; 650, Route Des Lucioles F-06921 Sophia-Antipolis Cedex; France, no. Busan, South Korea; Dec. 3, 2013-Dec. 7, 2013 Dec. 2, 2013, XP050733706, pp. 3, 4.

(Continued)

*Primary Examiner* — Man U Phan
(74) *Attorney, Agent, or Firm* — Young Basile Hanlon & MacFarlane, P.C.

(57) ABSTRACT

Provided are a resource allocation method and a resource allocation device, which are used for a frequency division duplexing system. The resource allocation method comprises: setting a shared frequency band; and according to resource demands for an original uplink frequency band and an original downlink frequency band in a network service, allocating the shared frequency band to the original uplink frequency band and/or the original downlink frequency band.

20 Claims, 5 Drawing Sheets

(58) Field of Classification Search
USPC .......... 370/310–329, 336–462; 455/454–509
See application file for complete search history.

(56) References Cited

U.S. PATENT DOCUMENTS

| | | | | |
|---|---|---|---|---|
| 8,615,250 B2* | 12/2013 | Xing | ..................... | H04W 16/14 |
| | | | | 370/231 |
| 8,700,078 B2* | 4/2014 | Harada | ................. | H04W 16/14 |
| | | | | 455/447 |
| 8,792,923 B2* | 7/2014 | Kato | ................. | H04W 72/0453 |
| | | | | 455/509 |
| 8,897,253 B2* | 11/2014 | Shin | ........................ | H04L 5/001 |
| | | | | 370/329 |
| 9,119,163 B2* | 8/2015 | Li | ........................ | H04W 52/265 |
| 9,215,715 B2* | 12/2015 | Liu | ........................ | H04W 16/10 |
| 2013/0083710 A1 | 4/2013 | Chen et al. | | |
| 2013/0301565 A1 | 11/2013 | Xu et al. | | |
| 2015/0245333 A1* | 8/2015 | Hulkkonen | ........... | H04W 16/14 |
| | | | | 370/329 |
| 2015/0358990 A1* | 12/2015 | Kovacs | ................. | H04W 24/02 |
| | | | | 370/329 |
| 2017/0374559 A1* | 12/2017 | Sun | ................... | H04W 28/0252 |

FOREIGN PATENT DOCUMENTS

| | | |
|---|---|---|
| CN | 102232307 A | 11/2011 |
| CN | 102300213 A | 12/2011 |
| CN | 103002451 A | 3/2013 |
| CN | 103037447 A | 4/2013 |

OTHER PUBLICATIONS

Extended European search report issued in corresponding European application No. 14891198.5 dated Nov. 20, 2017.

* cited by examiner

RESOURCE ALLOCATION METHOD AND RESOURCE ALLOCATION DEVICE

CROSS-REFERENCE TO RELATED APPLICATION(S)

This application is a continuation-in-part of international Patent Application PCT No. PCT/CN2014/095932, entitled "RESOURCE ALLOCATION METHOD AND RESOURCE ALLOCATION DEVICE", filed on Dec. 31, 2014, which claims priority to Chinese Patent Application No. 201410195864.3, filed on May 9, 2014, both of which are hereby incorporated by reference in their entireties.

TECHNICAL FIELD

The present disclosure relates to the technical field of resource allocation, specifically, relates to a resource allocation method and a resource allocation device.

BACKGROUND

With the continuous development of the LTE technology as well as the subsequent 5G pre-research project, spectrum is becoming quite insufficient, and thus a new generation of mobile communication technology is required to further improve spectrum efficiency than prior art. Studies found that generation of data service is closely related to user behavior. Furthermore, the generation of the data service is closely related to time and locations, and the service data has a serious asymmetry between uplinks and downlinks.

To this end, in the mobile communication technology in the prior art, eIMTA (enhanced Interference Mitigation and Traffic Adaptation) (dynamic TDD technology) is introduced. This technology flexibly adjusts proportion of an uplink resource to a downlink resource, such that the resource allocation is matched with proportion of an actual uplink load to an actual downlink load, thereby achieving the purpose of rationally using resources. However, this technology is merely applicable in a TDD (Time Division Duplexing) system, and could not be applicable in a FDD (Frequency Division Duplexing) system. The uplink resource and the downlink resource of the FDD system are allocated to an uplink dedicated frequency and a download dedicated frequency, respectively. Thus, the eIMTA technology could not adjust the proportion of the uplink resource to the downlink resource according to actual service demands.

Therefore, a new technology is required to realize a flexible duplexing solution of a FDD system, that is to say, flexibly adjust the uplink resource and the downlink resource of the FDD system according to actual network service demands.

SUMMARY

The present disclosure is addressed to the above problem, and provides a new technical solution which may flexibly adjust the uplink resource and the downlink resource of the FDD system, and achieve the purpose of rationally using the uplink resource and the downlink resource.

To this end, the present disclosure provides a resource allocation method, comprising: setting a shared frequency band; and allocating the shared frequency band to an original uplink frequency band and/or an original downlink frequency band, according to resource demands for the original uplink frequency band and the original downlink frequency band in a network service.

In this technical solution, firstly, one shared frequency band is set for the uplink frequency band and the downlink frequency band, such that when service demands are changed, the proportion of the resource allocated to the uplink frequency band to the resource allocated to the downlink frequency band may be rationally adjusted so as to meet the service demands. For example, in the original network service, the original uplink frequency bandwidth and the original downlink frequency bandwidth are both 10 MHz, while the shared frequency bandwidth is 5 MHz, and if after a period of time t, demands of users for the uplink frequency band are increased to 12 MHz, the uplink frequency bandwidth may be increased by means of utilizing the shared frequency band, i.e., 2 MHz is allocated from the shared frequency band which is 5 MHz to serve as the uplink resource, so as to meet the service demands. Thus, by means of the present technical solution, the uplink frequency bandwidth and the downlink frequency bandwidth of the FDD system may be adjusted in real time by fully utilizing the shared frequency band, so as to meet different network service demands and improve user experience.

In the above technical solution, it is preferable to further comprise: when the shared frequency band is simultaneously allocated to the original uplink frequency band and the original downlink frequency band, setting a protective isolation bandwidth between allocated uplink frequency band and allocated downlink frequency band; or when the shared frequency band is simultaneously allocated to the original uplink frequency band and the original downlink frequency band, setting protective time slots between allocated uplink sub-frames and allocated downlink sub-frames.

In this technical solution, the FDD system is a duplexing system having two channels (specifically, one uplink frequency band and one downlink frequency band). One channel is used to transmit downlink information, and the other channel is used to transmit uplink information. The information transmissions in these two channels are in opposite directions, and a transmitter and a receiver are disposed at two ends of each channel, respectively. Thus, by setting a certain isolation bandwidth between the channels (the uplink frequency band and the downlink frequency band), out-of-band interference (radiation) may be prevented and mutual interference between the adjacent transmitter and receiver may also be prevented. Furthermore, the shared frequency band may also be divided into portions for uplink transmission and portions for downlink transmission by time slots. The shared frequency band is divided into a plurality of uplink sub-frames and downlink sub-frames, and protective time slots are disposed between the uplink sub-frames and the downlink sub-frames, such that not only the interference may be prevented, but also the times for switching from the uplink to the downlink or from the downlink to the uplink are provided.

Meanwhile, prior wireless communication systems (such as LTE systems) may merely use continuously distributed and standardized broadband resources, such as 10 MHz, 20 MHz, and may not use frequency band resources which are non-continuous or have a non-standardized width. Thus, the shared frequency band may not be directly used after being allocated to the uplink frequency band and the downlink frequency band, and may be used only by means of dispatching the shared frequency band which is non-continuous or has a non-standardized width with prior CA (Carrier Aggregation) or NCT (New Carrier Type) technology.

In the above technical solution, it is preferable to further comprise: dividing the shared bandwidth of the shared frequency band into a plurality of dispatched units on the basis of preset frequency width or time width, and allocating corresponding quantity of dispatched units to the original uplink frequency band and the original downlink frequency band on the basis of the proportion of current network service.

In this technical solution, when allocating the shared bandwidth of the shared frequency band to the original uplink frequency band and the original downlink frequency band after dividing the bandwidth into a plurality of dispatched units on the basis of preset frequency width or time width, the required dispatched units may be quantified. Thus, by means of the present technical solution, the shared frequency spectrum may be effectively and accurately allocated on the basis of specific proportion of the uplink service to the downlink service, thereby improving the utilization rate of the shared frequency spectrum.

In the above technical solution, preferably, the shared frequency band is constituted by a dedicated frequency band, or is constituted by the original uplink frequency band or the original downlink frequency band in an idle state.

In this technical solution, the shared frequency band may be constituted by a dedicated band, however, with the increase of the service, if the shared frequency band is merely the dedicated band, the bandwidth demands of users may be far from met. Meanwhile, the demands of users for the uplink resource and the downlink resource are different, and sometimes, the uplink (downlink) resource may be too much while the downlink (uplink) resource may be not sufficient. At this moment, the uplink (downlink) frequency band in the idle state may be allocated as a shared frequency band to the downlink (uplink) frequency band, thereby increasing the downlink (uplink) resource to meet the network demands of users. Thus, by means of the present technical solution, the shared frequency band resource may be increased, and the proportion of the resource allocated to the uplink frequency band to the resource allocated to the downlink frequency band may be rationally adjusted, which is advantageous for improving the utilization rate of the uplink frequency band and the download frequency band and meeting the real-time requirements of users.

In the above technical solution, preferably, when the shared frequency band is constituted by the original uplink frequency band, an allocation unit may merely allocate the remaining resource of the original uplink frequency band except that required for necessary normal uplink transmission; when the shared frequency band is constituted by the original downlink frequency band, the allocation unit may merely allocate the remaining resource of the original downlink frequency band except that required for necessary normal downlink transmission.

In this technical solution, when the shared frequency band is constituted by the original uplink (downlink) frequency band, the allocation unit may not allocate all the shared frequency band to the downlink (uplink) frequency band, since a part of the original uplink (downlink) frequency band merely serves as the uplink (downlink) frequency band transmitting resource, and may not transmit the downlink (uplink) data.

In the above technical solution, preferably, the shared frequency band is constituted by unlicensed public frequency spectrum resources.

In this technical solution, with the increase of the network service for users, the shared frequency band constituted by a dedicated band, or constituted by the original uplink frequency band or the original downlink frequency band in the idle state is still quite limited, and the demands of users may not be effectively met. Furthermore, operators, in order to meet the demands of users, often need to buy these licensed frequency spectrum resources, however, it usually leads to a large expense to buy these licensed frequency spectrum resources. Thus, by means of the present technical solution, sources for the shared frequency band may be further increased, thereby meeting the network demands of users, improving user experience and reducing the economic cost of deploying the dedicated "shared frequency band" by operators.

In the above technical solution, preferably, when the shared frequency band is constituted by the unlicensed public frequency spectrum resources, the method further comprises: performing interference detection on the public frequency spectrum resources, and allowing the public frequency spectrum resources to serve as the shared frequency band when the interference with the public frequency spectrum resources is less than the preset interference threshold, otherwise, not allowing the public frequency spectrum resources to serve as the shared frequency band.

In this technical solution, the unlicensed public frequency spectrum resources may generally include much interference from other systems, such as Wi-Fi and so on. Thus, when being used, the interference detection should be performed with interference detection technology, in order to determine whether to serve as a shared frequency band. Therefore, by means of the present technical solution, it is ensured that the unlicensed shared frequency band has a high quality, such that users may smoothly use the network service.

When detecting the strength of the interference with the unlicensed public frequency spectrum, some prior interference detection technologies, such as cognitive radio technology may be utilized.

According to another aspect of the present disclosure, a resource allocation device is provided, comprises: a setting unit for setting a shared frequency band; and an allocation unit for allocating the shared frequency band to an original uplink frequency band and/or an original downlink frequency band, according to resource demands for the original uplink frequency band and the original downlink frequency band in a network service.

In this technical solution, firstly, one shared frequency band is set for the uplink frequency band and the downlink frequency band, such that when service demands are changed, the proportion of the resource allocated to the uplink frequency band to the resource allocated to the downlink frequency band may be rationally adjusted so as to meet the service demands. For example, in the original network service, the original uplink frequency bandwidth and the original downlink frequency bandwidth are both 10 MHz, while the shared frequency bandwidth is 5 MHz, and if after a period of time t, demands of users for the uplink frequency band are increased to 12 MHz, the uplink frequency bandwidth may be increased by means of utilizing the shared frequency band, i.e., 2 MHz is allocated from the shared frequency band which is 5 MHz to serve as the uplink resource, so as to meet the service demands. Thus, by means of the present technical solution, the uplink frequency bandwidth and the downlink frequency bandwidth of the FDD system may be adjusted in real time by fully utilizing the shared frequency band, so as to meet different network service demands and improve user experience.

In the above technical solution, preferably, the setting unit is further for, when the shared frequency band is simultaneously allocated to the original uplink frequency band and the original downlink frequency band, setting a protective isolation bandwidth between allocated uplink frequency band and allocated downlink frequency band; or when the shared frequency band is simultaneously allocated to the original uplink frequency band and the original downlink frequency band, setting protective time slots between allocated uplink sub-frames and allocated downlink sub-frames.

In this technical solution, the FDD system is a duplexing system having two channels (specifically, one uplink frequency band and one downlink frequency band). One channel is used to transmit downlink information, and the other channel is used to transmit uplink information. The information transmissions in these two channels are in opposite directions, and a transmitter and a receiver are disposed at two ends of each channel, respectively. Thus, by setting a certain isolation bandwidth between the channels (the uplink frequency band and the downlink frequency band), out-of-band interference (radiation) may be prevented, and mutual interference between the adjacent transmitter and receiver may also be prevented. Furthermore, the shared frequency band may also be divided into portions for uplink transmission and portions for downlink transmission by time slots. The shared frequency band is divided into a plurality of uplink sub-frames and downlink sub-frames, and protective time slots are disposed between the uplink sub-frames and the downlink sub-frames, such that not only interference may be prevented, but also times for switching from the uplink to the downlink or from the downlink to the uplink are provided.

Meanwhile, prior wireless communication systems (such as LTE systems) may only use continuously distributed and standardized broadband resources, such as 10 MHz, 20 MHz, and may not use frequency band resources which are non-continuous or have a non-standardized width. Thus, the shared frequency band may not be directly used after being allocated to the uplink frequency band and the downlink frequency band, and may be used only by means of dispatching the shared frequency band which is non-continuous or has a non-standardized width with prior CA (Carrier Aggregation) or NCT (New Carrier Type) technology.

In the above technical solution, preferably, the resource allocation device further comprises: a dividing unit for dividing the shared bandwidth of the shared frequency band into a plurality of dispatched units on the basis of preset frequency width or time width, and allocating corresponding quantity of dispatched units to the original uplink frequency band and the original downlink frequency band on the basis of the proportion of network service processed in the original uplink frequency band to network service processed in the original downlink frequency band.

In this technical solution, when allocating the shared bandwidth of the shared frequency band to the original uplink frequency band and the original downlink frequency band after dividing the bandwidth into a plurality of dispatched units on the basis of preset frequency width or time width, the required dispatched units may be quantified. Thus, by means of the present technical solution, the shared frequency spectrum may be effectively and accurately allocated on the basis of specific proportion of the uplink service to the downlink service, thereby improving the utilization rate of the shared frequency spectrum.

In the above technical solution, preferably, the shared frequency band is constituted by a dedicated frequency band, or is constituted by the original uplink frequency band or the original downlink frequency band in an idle state.

In this technical solution, the shared frequency band may be constituted by a dedicated band, however, with the increase of the service, if the shared frequency band is merely the dedicated band, the bandwidth demands of users may be far from met. Meanwhile, the demands of users for the uplink resource and the downlink resource are different, and sometimes, the uplink (downlink) resource may be too much while the downlink (uplink) resource may be not sufficient. At this moment, the uplink (downlink) frequency band in the idle state may be allocated as a shared frequency band to the downlink (uplink) frequency band, thereby increasing the downlink (uplink) resource to meet the network demands of users. Thus, by means of the present technical solution, the shared frequency band resource may be increased, and the proportion of the resource allocated to the uplink frequency band to the resource allocated to the downlink frequency band may be rationally adjusted, which is advantageous for improving the utilization rate of the uplink frequency band and the download frequency band and meeting the real-time requirements of users.

In the above technical solution, preferably, when the shared frequency band is constituted by the original uplink frequency band, the allocation unit may merely allocate the remaining resource of the original uplink frequency band except that required for necessary normal uplink transmission; when the shared frequency band is constituted by the original downlink frequency band, the allocation unit may merely allocate the remaining resource of the original downlink frequency band except that required for necessary normal downlink transmission.

In this technical solution, when the shared frequency band is constituted by the original uplink (downlink) frequency band, the allocation unit may not allocate all the shared frequency band to the downlink (uplink) frequency band, since a part of the original uplink (downlink) frequency band merely serves as the uplink (downlink) frequency band transmitting resource, and may not transmit the downlink (uplink) data.

In the above technical solution, preferably, the shared frequency band is constituted by unlicensed public frequency spectrum resources.

In this technical solution, with the increase of the network service for users, the shared frequency band constituted by a dedicated band, or constituted by the original uplink frequency band or the original downlink frequency band in the idle state is still quite limited, and the demands of users may not be effectively met. Furthermore, operators, in order to meet the demands of users, often need to buy these licensed frequency spectrum resources, however, it usually leads to a large expense to buy these licensed frequency spectrum resources. Thus, by means of the present technical solution, sources for the shared frequency band may be further increased, thereby meeting the network demands of users, improving user experience and reducing the economic cost of deploying the dedicated "shared frequency band" by operators.

In the above technical solution, preferably, when the shared frequency band is constituted by the unlicensed public frequency spectrum resources, the device is further for performing interference detection on the public frequency spectrum resources, and allowing the public frequency spectrum resources to serve as the shared frequency band when the interference with the public frequency spectrum resources is less than the preset interference threshold, otherwise, not allowing the public frequency spectrum resources to serve as the shared frequency band.

In this technical solution, the unlicensed public frequency spectrum resources may generally include much interference from other systems, such as Wi-Fi and so on. Thus, when being used, the interference detection should be performed with interference detection technology, in order to determine whether to serve as a shared frequency band. Therefore, by means of the present technical solution, it is ensured that the unlicensed shared frequency band has a high quality, such that users may smoothly use the network service.

When detecting the strength of the interference with the unlicensed public frequency spectrum, some prior interference detection technologies, such as cognitive radio technology may be utilized.

By means of the technical solution of the present disclosure, the uplink resource and the downlink resource of the FDD system may be flexibly adjusted on the basis of actual service proportion, such that the allocation proportion of the uplink resource to the downlink resource is matched with the proportion of an actual uplink load to an actual downlink load, thereby achieving the purpose of rationally using resources.

DETAILED DESCRIPTION

The present disclosure is further described in detail hereinafter with reference to the accompanying drawings and implementations, in order to more fully understand the above-mentioned purposes, features and advantages of the present disclosure. It should be noted that, when not conflicting, the implementations of the present application and features in the implementations could be combined mutually.

A lot of details are set forth in the below description so as to fully understand the present disclosure, however, the present disclosure may also be implemented by adopting other implementations different from those as described herein, and therefore, the protection scope of the present disclosure is not limited by the implementations disclosed below.

Figure 1:
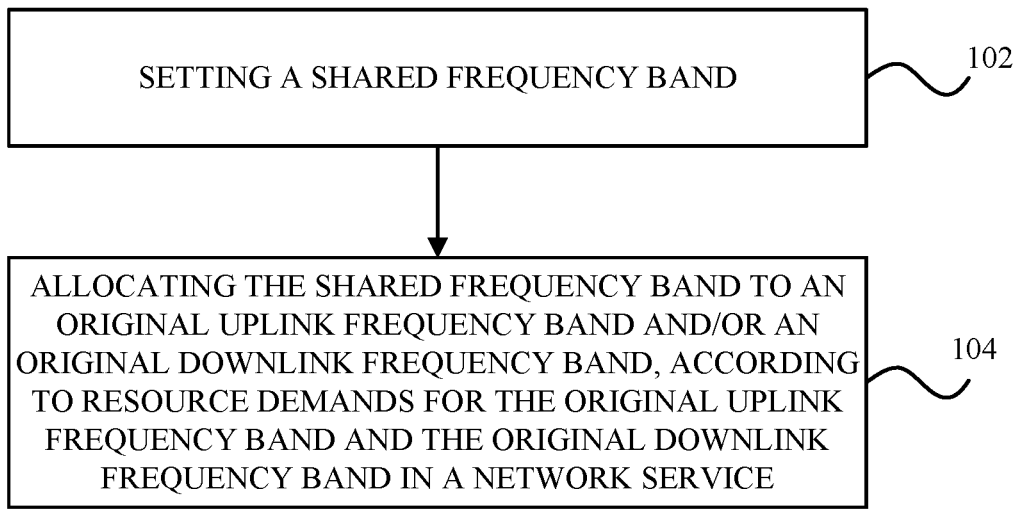
FIG. 1 shows a flowchart of a resource allocation method according to an implementation of the present disclosure.

FIG. 1 shows a flowchart of a resource allocation method according to an implementation of the present disclosure.

As shown in FIG. 1, a resource allocation method according to an implementation of the present disclosure, comprises: a step 102 of setting a shared frequency band; and a step 104 of allocating the shared frequency band to an original uplink frequency band and/or an original downlink frequency band, according to resource demands for the original uplink frequency band and the original downlink frequency band in a network service.

In this technical solution, firstly, one shared frequency band is set for the uplink frequency band and the downlink frequency band, such that when service demands are changed, the proportion of the resource allocated to the uplink frequency band to the resource allocated to the downlink frequency band may be rationally adjusted so as to meet the service demands. For example, in the original network service, the original uplink frequency bandwidth and the original downlink frequency bandwidth are both 10 MHz, while the shared frequency bandwidth is 5 MHz, and if after a period of time t, demands of users for the uplink frequency band are increased to 12 MHz, the uplink frequency bandwidth may be increased by means of utilizing the shared frequency band, i.e., 2 MHz is allocated from the shared frequency band which is 5 MHz to serve as the uplink resource, so as to meet the service demands. Thus, by means of the present technical solution, the uplink frequency bandwidth and the downlink frequency bandwidth of the FDD system may be adjusted in real time by fully utilizing the shared frequency band, so as to meet different network service demands and improve user experience.

In the above technical solution, it is preferable to further comprise: when the shared frequency band is simultaneously allocated to the original uplink frequency band and the original downlink frequency band, setting a protective isolation bandwidth between allocated uplink frequency band and allocated downlink frequency band; or when the shared frequency band is simultaneously allocated to the original uplink frequency band and the original downlink frequency band, setting protective time slots between allocated uplink sub-frames and allocated downlink sub-frames.

Figure 4:
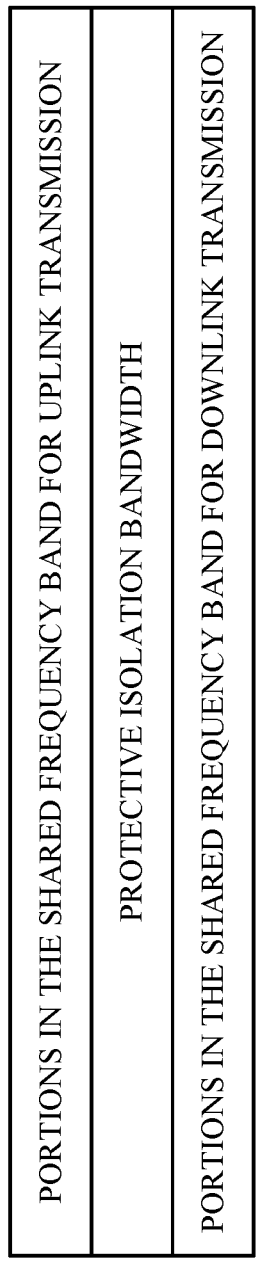
FIG. 4 shows a schematic diagram of a specific setting mode of an isolation bandwidth according to an implementation of the present disclosure.

In this technical solution, the FDD system is a duplexing system having two channels (specifically, one uplink frequency band and one downlink frequency band). One channel is used to transmit downlink information, and the other channel is used to transmit uplink information. The information transmissions in these two channels are in opposite directions, and a transmitter and a receiver are disposed at two ends of each channel, respectively. Thus, by setting a certain isolation bandwidth between the channels (the uplink frequency band and the downlink frequency band), out-of-band interference (radiation) may be prevented and mutual interference between the adjacent transmitter and receiver may also be prevented. The specific setting mode of the isolation bandwidth is as shown in FIG. 4.

Figure 7:
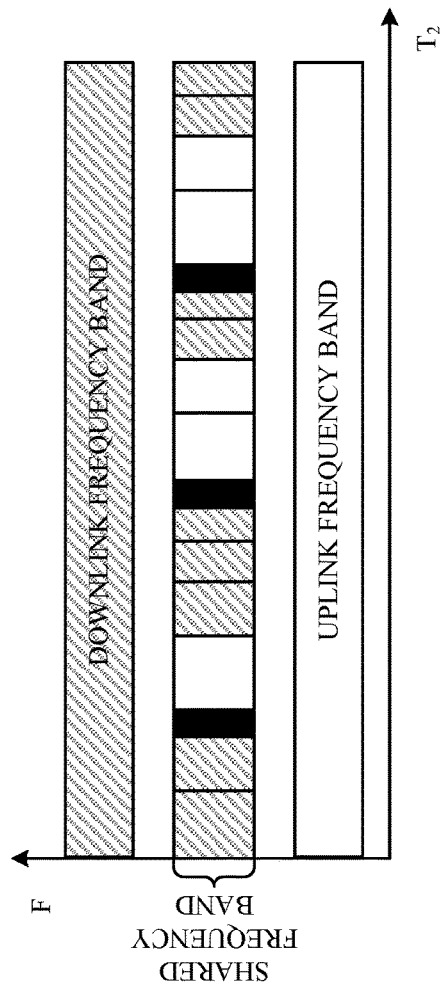
FIG. 7 shows a schematic diagram of a specific mode of allocating resource by an allocation unit to an uplink and a downlink according to another implementation of the present disclosure.

Furthermore, the shared frequency band may also be divided into portions for uplink transmission and portions for downlink transmission by time slots. The shared frequency band is divided into a plurality of uplink sub-frames and downlink sub-frames, and protective time slots are disposed between the uplink sub-frames and the downlink sub-frames, such that not only the interference may be prevented, but also the times for switching from the uplink to the downlink or from the downlink to the uplink are provided. The specific setting mode of the protective time slots is as shown in FIG. 7.

Meanwhile, prior wireless communication systems (such as LTE systems) may merely use continuously distributed and standardized broadband resources, such as 10 MHz, 20

MHz, and may not use frequency band resources which are non-continuous or have a non-standardized width. Thus, the shared frequency band may not be directly used after being allocated to the uplink frequency band and the downlink frequency band, and may be used only by means of dispatching the shared frequency band which is non-continuous or has a non-standardized width with prior CA (Carrier Aggregation) or NCT (New Carrier Type) technology.

In the above technical solution, it is preferable to further comprise: dividing the shared bandwidth of the shared frequency band into a plurality of dispatched units on the basis of preset frequency width or time width, and allocating corresponding quantity of dispatched units to the original uplink frequency band and the original downlink frequency band on the basis of the proportion of current network service.

Figure 5:
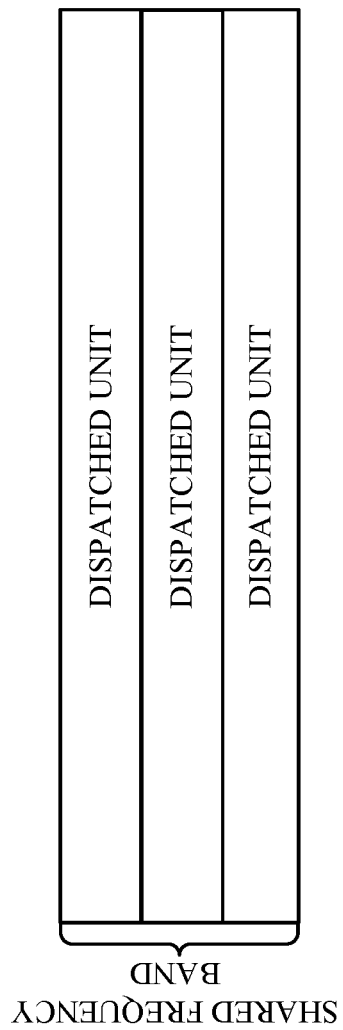
FIG. 5 shows a schematic diagram of dividing a shared bandwidth into dispatched units on the basis of frequency width according to an implementation of the present disclosure.

In this technical solution, when allocating the shared bandwidth of the shared frequency band to the original uplink frequency band and the original downlink frequency band after dividing the bandwidth into a plurality of dispatched units on the basis of preset frequency width or time width, the required dispatched units may be quantified. Thus, by means of the present technical solution, the shared frequency spectrum may be effectively and accurately allocated on the basis of specific proportion of the uplink service to the downlink service, thereby improving the utilization rate of the shared frequency spectrum. A mode of dividing the shared bandwidth into the dispatched units on the basis of a certain frequency width is as shown in FIG. 5.

In the above technical solution, preferably, the shared frequency band is constituted by a dedicated frequency band, or is constituted by the original uplink frequency band or the original downlink frequency band in an idle state.

In this technical solution, the shared frequency band may be constituted by a dedicated band, however, with the increase of the service, if the shared frequency band is merely the dedicated band, the bandwidth demands of users may be far from met. Meanwhile, the demands of users for the uplink resource and the downlink resource are different, and sometimes, the uplink (downlink) resource may be too much while the downlink (uplink) resource may be not sufficient. At this moment, the uplink (downlink) frequency band in the idle state may be allocated as a shared frequency band to the downlink (uplink) frequency band, thereby increasing the downlink (uplink) resource to meet the network demands of users. Thus, by means of the present technical solution, the shared frequency band resource may be increased, and the proportion of the resource allocated to the uplink frequency band to the resource allocated to the downlink frequency band may be rationally adjusted, which is advantageous for improving the utilization rate of the uplink frequency band and the download frequency band and meeting the real-time requirements of users.

In the above technical solution, preferably, when the shared frequency band is constituted by the original uplink frequency band, an allocation unit may merely allocate the remaining resource of the original uplink frequency band except that required for necessary normal uplink transmission; when the shared frequency band is constituted by the original downlink frequency band, the allocation unit may merely allocate the remaining resource of the original downlink frequency band except that required for necessary normal downlink transmission.

Figure 6:
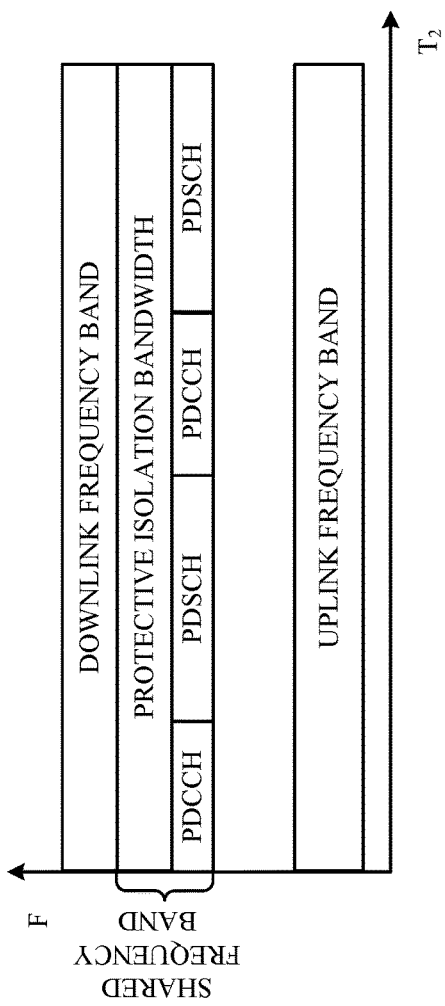
FIG. 6 shows a schematic diagram of a specific mode of allocating resource by an allocation unit to an uplink and a downlink according to an implementation of the present disclosure.

In this technical solution, when the shared frequency band is constituted by the original uplink (downlink) frequency band, the allocation unit may not allocate all the shared frequency band to the downlink (uplink) frequency band, since a part of the original uplink (downlink) frequency band merely serves as the uplink (downlink) frequency band transmitting resource, and may not transmit the downlink (uplink) data. A specific mode of allocating resource by the allocation unit to the uplink and the downlink is as shown in FIG. 6.

In the above technical solution, preferably, the shared frequency band may be constituted by unlicensed public frequency spectrum resources.

In this technical solution, with the increase of the network service for users, the shared frequency band constituted by a dedicated band, or constituted by the original uplink frequency band or the original downlink frequency band in the idle state is still quite limited, and the demands of users may not be effectively met. Furthermore, operators, in order to meet the demands of users, often need to buy these licensed frequency spectrum resources, however, it usually leads to a large expense to buy these licensed frequency spectrum resources. Thus, by means of the present technical solution, sources for the shared frequency band may be further increased, thereby meeting the network demands of users, improving user experience and reducing the economic cost of deploying the dedicated "shared frequency band" by operators.

In the above technical solution, when the shared frequency band is constituted by the unlicensed public frequency spectrum resources, it is preferable to further comprise: performing interference detection on the public frequency spectrum resources, and allowing the public frequency spectrum resources to serve as the shared frequency band when the interference with the public frequency spectrum resources is less than the preset interference threshold, otherwise, not allowing the public frequency spectrum resources to serve as the shared frequency band.

In this technical solution, the unlicensed public frequency spectrum resources may generally include much interference from other systems, such as Wi-Fi and so on. Thus, when being used, the interference detection should be performed with interference detection technology, in order to determine whether to serve as a shared frequency band. Therefore, by means of the present technical solution, it is ensured that the unlicensed shared frequency band has a high quality, such that users may smoothly use the network service.

When detecting the strength of the interference with the unlicensed public frequency spectrum, some prior interference detection technologies, such as cognitive radio technology may be utilized.

Figure 2:
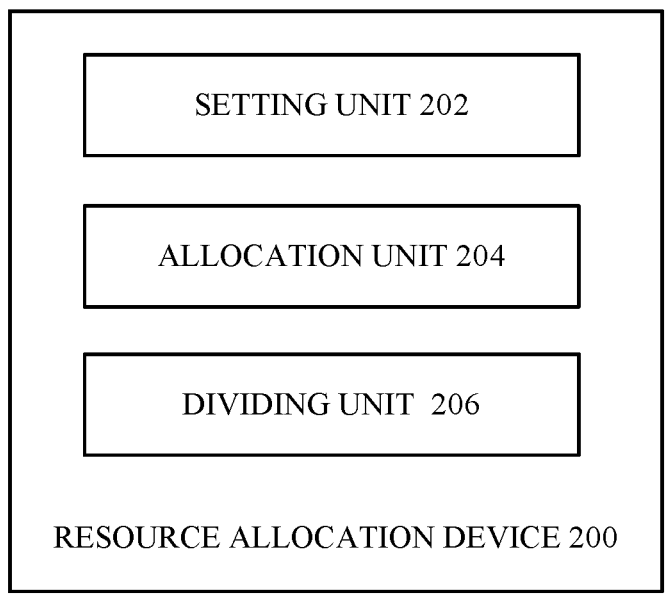
FIG. 2 shows a schematic structural diagram of a resource allocation device according to an implementation of the present disclosure.

FIG. 2 shows a schematic structural diagram of a resource allocation device according to an implementation of the present disclosure.

As shown in FIG. 2, a resource allocation device 200 according to an implementation of the present disclosure, comprises: a setting unit 202 for setting a shared frequency band; and an allocation unit 204 for allocating the shared frequency band to an original uplink frequency band and/or an original downlink frequency band, according to resource demands for the original uplink frequency band and the original downlink frequency band in a network service.

In this technical solution, firstly, one shared frequency band is set for the uplink frequency band and the downlink frequency band, such that when service demands are changed, the proportion of the resource allocated to the uplink frequency band to the resource allocated to the downlink frequency band may be rationally adjusted so as to meet the service demands. For example, in the original network service, the original uplink frequency bandwidth and the original downlink frequency bandwidth are both 10 MHz, while the shared frequency bandwidth is 5 MHz, and if after a period of time t, demands of users for the uplink frequency band are increased to 12 MHz, the uplink frequency bandwidth may be increased by means of utilizing the shared frequency band, i.e., 2 MHz is allocated from the shared frequency band which is 5 MHz to serve as the uplink resource, so as to meet the service demands. Thus, by means of the present technical solution, the uplink frequency bandwidth and the downlink frequency bandwidth of the FDD system may be adjusted in real time by fully utilizing the shared frequency band, so as to meet different network service demands and improve user experience.

In the above technical solution, preferably, the setting unit 202 is further for, when the shared frequency band is simultaneously allocated to the original uplink frequency band and the original downlink frequency band, setting a protective isolation bandwidth between allocated uplink frequency band and allocated downlink frequency band; or when the shared frequency band is simultaneously allocated to the original uplink frequency band and the original downlink frequency band, setting protective time slots between allocated uplink sub-frames and allocated downlink sub-frames.

In this technical solution, the FDD system is a duplexing system having two channels (specifically, one uplink frequency band and one downlink frequency band). One channel is used to transmit downlink information, and the other channel is used to transmit uplink information. The information transmissions in these two channels are in opposite directions, and a transmitter and a receiver are disposed at two ends of each channel, respectively. Thus, by setting a certain isolation bandwidth between the channels (the uplink frequency band and the downlink frequency band), out-of-band interference (radiation) may be prevented, and mutual interference between the adjacent transmitter and receiver may also be prevented. The specific setting mode of the isolation bandwidth is as shown in FIG. 4.

Furthermore, the shared frequency band may also be divided into portions for uplink transmission and portions for downlink transmission by time slots. The shared frequency band is divided into a plurality of uplink sub-frames and downlink sub-frames, and protective time slots are disposed between the uplink sub-frames and the downlink sub-frames, such that not only interference may be prevented, but also times for switching from the uplink to the downlink or from the downlink to the uplink are provided. The specific setting mode of the protective time slots is as shown in FIG. 7.

Meanwhile, prior wireless communication systems (such as LTE systems) may only use continuously distributed and standardized broadband resources, such as 10 MHz, 20 MHz, and may not use frequency band resources which are non-continuous or have a non-standardized width. Thus, the shared frequency band may not be directly used after being allocated to the uplink frequency band and the downlink frequency band, and may be used only by means of dispatching the shared frequency band which is non-continuous or has a non-standardized width with prior CA (Carrier Aggregation) or NCT (New Carrier Type) technology.

In the above technical solution, it is preferable to further comprise a dividing unit 206 for dividing the shared bandwidth of the shared frequency band into a plurality of dispatched units on the basis of preset frequency width or time width, and allocating corresponding quantity of dispatched units to the original uplink frequency band and the original downlink frequency band on the basis of the proportion of network service processed in the original uplink frequency band to network service processed in the original downlink frequency band.

In this technical solution, when allocating the shared bandwidth of the shared frequency band to the original uplink frequency band and the original downlink frequency band after dividing the bandwidth into a plurality of dispatched units on the basis of preset frequency width or time width, the required dispatched units may be quantified. Thus, by means of the present technical solution, the shared frequency spectrum may be effectively and accurately allocated on the basis of specific proportion of the uplink service to the downlink service, thereby improving the utilization rate of the shared frequency spectrum. A mode of dividing the shared bandwidth into the dispatched units on the basis of a certain frequency width is as shown in FIG. 5.

In the above technical solution, preferably, the shared frequency band is constituted by a dedicated frequency band, or is constituted by the original uplink frequency band or the original downlink frequency band in an idle state.

In this technical solution, the shared frequency band may be constituted by a dedicated band, however, with the increase of the service, if the shared frequency band is merely the dedicated band, the bandwidth demands of users may be far from met. Meanwhile, the demands of users for the uplink resource and the downlink resource are different, and sometimes, the uplink (downlink) resource may be too much while the downlink (uplink) resource may be not sufficient. At this moment, the uplink (downlink) frequency band in the idle state may be allocated as a shared frequency band to the downlink (uplink) frequency band, thereby increasing the downlink (uplink) resource to meet the network demands of users. Thus, by means of the present technical solution, the shared frequency band resource may be increased, and the proportion of the resource allocated to the uplink frequency band to the resource allocated to the downlink frequency band may be rationally adjusted, which is advantageous for improving the utilization rate of the uplink frequency band and the download frequency band and meeting the real-time requirements of users.

In the above technical solution, preferably, when the shared frequency band is constituted by the original uplink frequency band, the allocation unit 204 may merely allocate the remaining resource of the original uplink frequency band except that required for necessary normal uplink transmission; when the shared frequency band is constituted by the original downlink frequency band, the allocation unit 204 may merely allocate the remaining resource of the original downlink frequency band except that required for necessary normal downlink transmission.

In this technical solution, when the shared frequency band is constituted by the original uplink (downlink) frequency band, the allocation unit 204 may not allocate all the shared frequency band to the downlink (uplink) frequency band, since a part of the original uplink (downlink) frequency band merely serves as the uplink (downlink) frequency band transmitting resource, and may not transmit the downlink (uplink) data. A specific mode of allocating resource by the allocation unit to the uplink and the downlink is as shown in FIG. 6.

In the above technical solution, preferably, the shared frequency band may be constituted by unlicensed public frequency spectrum resources.

In this technical solution, with the increase of the network service for users, the shared frequency band constituted by a dedicated band, or constituted by the original uplink frequency band or the original downlink frequency band in the idle state is still quite limited, and the demands of users may not be effectively met. Furthermore, operators, in order to meet the demands of users, often need to buy these licensed frequency spectrum resources, however, it usually leads to a large expense to buy these licensed frequency spectrum resources. Thus, by means of the present technical solution, sources for the shared frequency band may be further increased, thereby meeting the network demands of users, improving user experience and reducing the economic cost of deploying the dedicated "shared frequency band" by operators.

In the above technical solution, preferably, when the shared frequency band is constituted by the unlicensed public frequency spectrum resources, it is preferable to further comprise: performing interference detection on the public frequency spectrum resources, and allowing the public frequency spectrum resources to serve as the shared frequency band when the interference with the public frequency spectrum resources is less than the preset interference threshold, otherwise, not allowing the public frequency spectrum resources to serve as the shared frequency band.

In this technical solution, the unlicensed public frequency spectrum resources may generally include much interference from other systems, such as Wi-Fi and so on. Thus, when being used, the interference detection should be performed with interference detection technology, in order to determine whether to serve as a shared frequency band. Therefore, by means of the present technical solution, it is ensured that the unlicensed shared frequency band has a high quality, such that users may smoothly use the network service.

When detecting the strength of the interference with the unlicensed public frequency spectrum, some prior interference detection technologies, such as cognitive radio technology may be utilized.

Figure 3A:
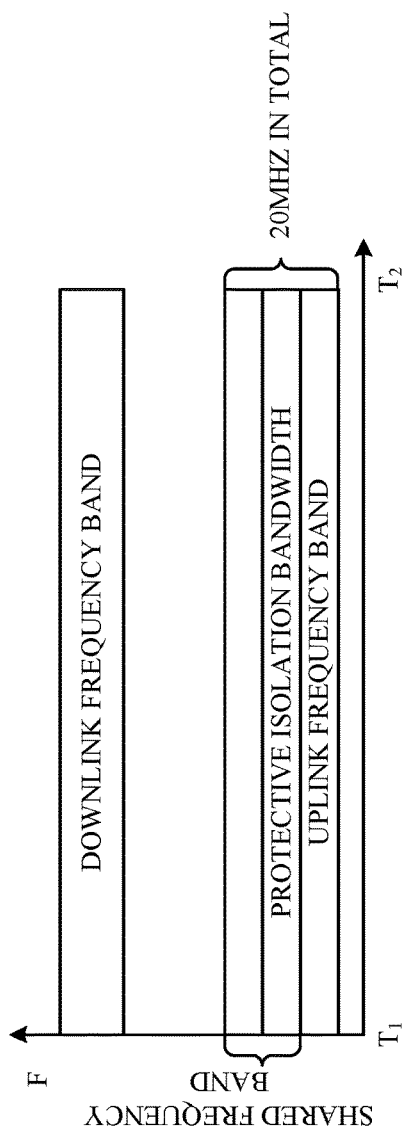
FIG. 3A and 3B show schematic diagrams of allocating a non-dedicated "shared frequency band" according to an implementation of the present disclosure.
Figure 3B:
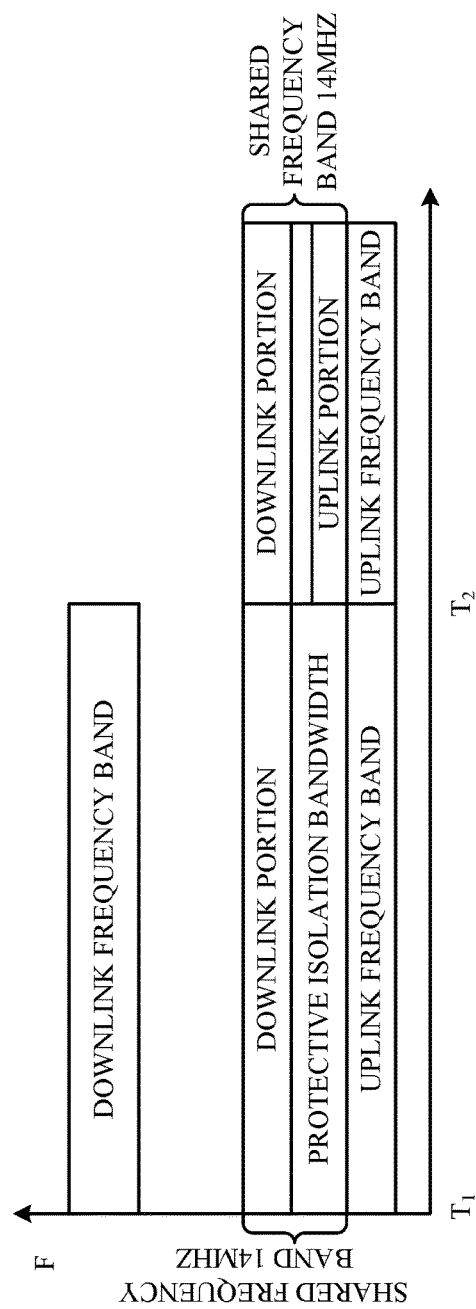

FIG. 3A and 3B show schematic diagrams of allocating a non-dedicated "shared frequency band" according to an implementation of the present disclosure As shown in FIG. 3A, if detecting the demands of users in a community for downlink data transmission gradually increasing and the demands for uplink data transmission gradually decreasing currently from a moment $t_1$, a base station may determine a proper proportion of the downlink resource to the uplink resource according to a certain algorithm. Provided that the uplink resource: the downlink resource=5:1 and the probably required total downlink resource, for example 30 MHz, is estimated according to a certain algorithm, the required uplink resource is probably 6 MHz.

Provided that the original uplink bandwidth and the original downlink bandwidth are both 20 MHz, the uplink frequency bandwidth may be reduced at this time, and the saved bandwidth of approximately 14 MHz may be used as a "shared frequency band".

In the case of the foregoing service demands, the shared frequency band of approximately 14 MHz may be all allocated to the downlink, and the downlink data may be dispatched in this bandwidth with the CA or NCT technology so as to increase the downlink resource quantity and increase the downlink throughput. Alternatively, 10 MHz of the resource may be allocated to the downlink, while the remaining 4 MHz is temporarily not utilized. Meanwhile, since the shared frequency band is constituted by the "saved" uplink resource and the adjacent frequency is currently for uplink transmission, a sufficient "protective isolation bandwidth" is required.

As shown in FIG. 3B, when the behavior of users changes at a moment $t_2$, the uplink resource is required to increase to 10 MHz and the downlink resource is required to reduce to 25 MHz according to a certain algorithm. At this time, the resources may be reallocated. 4 MHz is allocated to the uplink from the original shared frequency band of 14 MHz, and the remaining part except the protective bandwidth may be partially or all allocated to the downlink.

FIG. 3A and FIG. 3B specifically show the allocation mode of the non-dedicated "shared frequency band", however, if an operator has extra frequency spectrum or unlicensed frequency spectrum to be used as a "shared frequency band", a frequency of a certain width may be allocated independently to serve as the dedicated "shared frequency band". The allocation mode of the dedicated "shared frequency band" is similar to the mode as shown in FIG. 3A and FIG. 3B, i.e., when the downlink data quantity increases at a certain moment, the base station may allocate a certain quantity of "shared frequency band" (considering dispatched units as allocation granularities) to the downlink, so as to supplement the downlink resource. In contrast, when the uplink resource is inadequate, a certain quantity of "shared frequency band" (considering dispatched units as allocation granularities) may be allocated to the uplink, so as to supplement the uplink resource. And when the "shared frequency band" is simultaneously allocated to the uplink and the downlink, it is necessary to arrange a "protective isolation bandwidth" of a certain width in the "shared frequency band".

FIG. 4 shows a schematic diagram of a specific setting mode of an isolation bandwidth according to an implementation of the present disclosure.

Because of the out-of-band radiation, when the "shared frequency band" is simultaneously for the uplink and downlink transmission, it is necessary to arrange a protective bandwidth of a certain width between the uplink portion and the downlink portion, so as to avoid the generation of the out-of-band interference. The specific setting mode of the isolation bandwidth in the shared frequency band in the FDD system is as shown in FIG. 4.

FIG. 5 shows a schematic diagram of dividing a shared bandwidth into dispatched units on the basis of frequency width according to an implementation of the present disclosure.

In order to further effectively utilize the shared frequency spectrum, it is necessary to perform resource division on the shared frequency band, and thus the shared bandwidth defines dispatched units of a certain frequency width, thereby facilitating effectively dispatching according to the proportion of the uplink service to the downlink service. The specific division mode of dispatched units is as shown in FIG. 5. In this way, the base station, when allocating resource, may allocate a certain quantity of dispatched units to the uplink or downlink resource according to specific service demands.

FIG. 6 shows a schematic diagram of a specific mode of allocating resource by an allocation unit to an uplink and a downlink according to an implementation of the present disclosure.

As shown in FIG. 6, the shared frequency band is constituted by a part of the downlink spectrum, and when the shared frequency band is utilized by the uplink, the base station may merely use the PDSCH portion except the PDCCH (a frequency band which should serve as the downlink transmitting resource) portion during the uplink dispatching.

Furthermore, the shared frequency band may also be divided into portions for uplink transmission and portions for downlink transmission by time slots. As shown in FIG. 7, the shared frequency band is divided into portions for uplink transmission and portions for downlink transmission by time slots. Between the uplink sub-frames and the downlink sub-frames in the "shared frequency band", the protective time slots are required to be inserted, i.e., a certain isolation time (black solid portion in the FIG. 7) should be added between the uplink frequency band and the downlink frequency band. In this way, not only the interference may be prevented, but also the times for switching from the uplink to the downlink or from the downlink to the uplink are provided.

Figure 8:
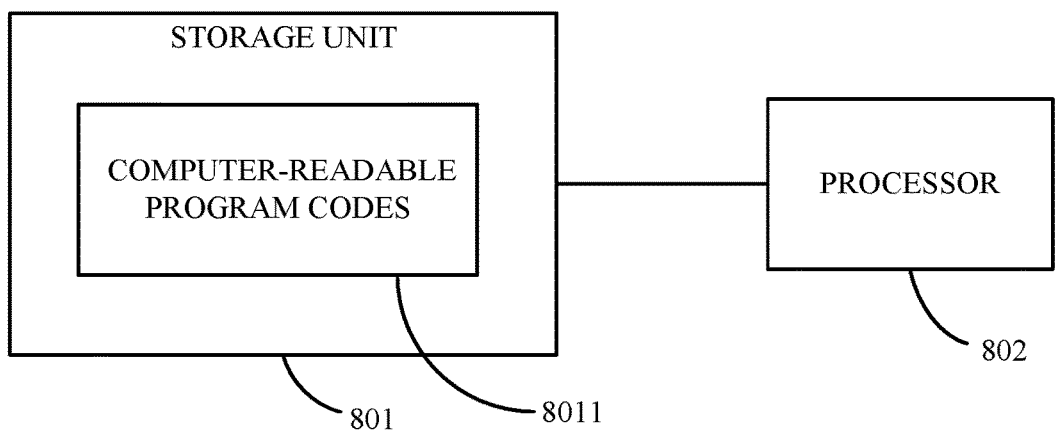
FIG. 8 shows a schematic structural diagram of a resource allocation device according to an implementation of the present disclosure.

FIG. 8 shows a schematic structural diagram of a resource allocation device according to an implementation of the present disclosure.

As shown in FIG. 8, a resource allocation device according to an implementation of the present disclosure can include but not limited to a storage unit 801, and a processor 802. The storage unit 801 is electrically connected to the processor 802.

The storage unit 801 is configured to store a plurality of computer-readable program codes 8011. The storage unit 801 can be a read only memory (ROM), a random access memory (RAM), a U-disk, a removable hard disk, etc.

The processor 802 can include multiple cores for multi-thread or parallel processing.

In this implementation, the processor 802 is configured to execute the plurality of computer-readable program codes 8011 to set a shared frequency band; and allocate the shared frequency band to an original uplink frequency band and/or an original downlink frequency band, according to resource demands for the original uplink frequency band and the original downlink frequency band in a network service.

In this implementation, the processor is further configured to execute the plurality of computer-readable program codes to, when the shared frequency band is simultaneously allocated to the original uplink frequency band and the original downlink frequency band, set a protective isolation bandwidth between allocated uplink frequency band and allocated downlink frequency band; or when the shared frequency band is simultaneously allocated to the original uplink frequency band and the original downlink frequency band, set protective time slots between allocated uplink sub-frames and allocated downlink sub-frames.

In this implementation, the processor is further configured to execute the plurality of computer-readable program codes to divide the shared bandwidth of the shared frequency band into a plurality of dispatched units on the basis of preset frequency width or time width, and allocate corresponding quantity of dispatched units to the original uplink frequency band and the original downlink frequency band on the basis of the proportion of current network service.

In this implementation, the shared frequency band is constituted by a dedicated frequency band, or is constituted by the original uplink frequency band or the original downlink frequency band in an idle state.

In this implementation, when the shared frequency band is constituted by the original uplink frequency band, the processor is further configured to execute the plurality of computer-readable program codes to merely allocate the remaining resource of the original uplink frequency band except that required for necessary normal uplink transmission; when the shared frequency band is constituted by the original downlink frequency band, the processor is further configured to execute the plurality of computer-readable program codes to merely allocate the remaining resource of the original downlink frequency band except that required for necessary normal downlink transmission.

In this implementation, the shared frequency band is constituted by unlicensed public frequency spectrum resources.

In this implementation, when the shared frequency band is constituted by the unlicensed public frequency spectrum resources, the processor is further configured to execute the plurality of computer-readable program codes to perform interference detection on the public frequency spectrum resources, and allow the public frequency spectrum resources to serve as the shared frequency band when the interference with the public frequency spectrum resources is less than the preset interference threshold, otherwise, not allow the public frequency spectrum resources to serve as the shared frequency band.

The technical solution of the present disclosure is described in detail in conjunction with the accompanying drawings. By means of the technical solution of the present disclosure, a flexible duplexing solution of a FDD system can be realized, so that the allocation proportion of an uplink resource to a downlink resource is matched with the proportion of an actual uplink load to an actual downlink load, thereby achieving the purpose of rationally using resources.

The foregoing is merely the preferable implementations of the present disclosure, and is not intended to limit the present disclosure. For persons skilled in the art, the present disclosure could have various modifications and variations. Any amendments, equivalents, or improvements and so on within the spirit and principle of the present disclosure should be included within the protection scope of the present disclosure.

What is claimed is:

1. A method for resource allocation used in a frequency division duplexing system, comprising:
   determining a shared frequency band;
   in accordance with a first resource demands for an original uplink frequency band and a second resource demands for an original downlink frequency band determined in a network service, allocating the shared frequency band to at least one of the original uplink frequency band and the original downlink frequency band; and
   when the shared frequency band is simultaneously allocated to the original uplink frequency band and the original downlink frequency band, setting a protective isolation bandwidth between the original uplink frequency band allocated with the shared frequency band and the original downlink frequency band allocated with the shared frequency band.

2. The method of claim 1, further comprising:
   when the shared frequency band is simultaneously allocated to the original uplink frequency band and the original downlink frequency band, setting protective time slots between uplink sub-frames and downlink sub-frames, wherein the uplink sub-frames and the downlink sub-frames are divided from the shared frequency band.

3. The method of claim 1, further comprising:
   based on one of a preset frequency width and a time width, dividing a shared bandwidth of the shared frequency band into a plurality of dispatched units; and
   based on a proportion of the network service, allocating a first quantity of the dispatched units to the original uplink frequency band and a second quantity of the dispatched units to the original downlink frequency band.

4. The method of claim 1, wherein the shared frequency band comprises one of a dedicated frequency band, the original uplink frequency band in an idle state, and the original downlink frequency band in an idle state.

5. The method of claim 4, further comprising:
when the shared frequency band comprises the original uplink frequency band in the idle state, allocating a remaining resource of the original uplink frequency band excluding a required resource for normal uplink transmission; and
when the shared frequency band comprises the original downlink frequency band in the idle state, allocating a remaining resource of the original downlink frequency band excluding a required resource for normal downlink transmission.

6. The method of claim 1, wherein the shared frequency band comprises an unlicensed public frequency spectrum resource.

7. The method of claim 6, further comprising:
when the shared frequency band comprises the unlicensed public frequency spectrum resource:
detecting an interference with the unlicensed public frequency spectrum resource;
when the interference with the unlicensed public frequency spectrum resource is less than a preset interference threshold, allowing the unlicensed public frequency spectrum resource to serve as the shared frequency band; and
when the interference with the unlicensed public frequency spectrum resource is greater than or equal to the preset interference threshold, not allowing the unlicensed public frequency spectrum resource to serve as the shared frequency band.

8. A device for resource allocation, comprising:
a processor; and
a memory coupled to the processor, the memory configured to store a set of instructions which when executed by the processor become operational with the processor to:
determine a shared frequency band;
in accordance with a first resource demands for an original uplink frequency band and a second resource demands for an original downlink frequency band determined in a network service, allocate the shared frequency band to at least one of the original uplink frequency band and the original downlink frequency band; and
when the shared frequency band is simultaneously allocated to the original uplink frequency band and the original downlink frequency band, set a protective isolation bandwidth between the original uplink frequency band allocated with the shared frequency band and the original downlink frequency band allocated with the shared frequency band.

9. The device of claim 8, wherein the memory includes further instructions to:
when the shared frequency band is simultaneously allocated to the original uplink frequency band and the original downlink frequency band, set protective time slots between uplink sub-frames and downlink sub-frames, wherein the uplink sub-frames and the downlink sub-frames are divided from the shared frequency band.

10. The device of claim 8, wherein the memory includes further instructions to:
based on one of a preset frequency width and a time width, divide a shared bandwidth of the shared frequency band into a plurality of dispatched units; and
based on a proportion of the network service, allocate a first quantity of the dispatched units to the original uplink frequency band and a second quantity of the dispatched units to the original downlink frequency band.

11. The device of claim 8, wherein the shared frequency band comprises one of a dedicated frequency band, the original uplink frequency band in an idle state, and the original downlink frequency band in an idle state.

12. The device of claim 11, wherein the memory includes further instructions to:
when the shared frequency band comprises the original uplink frequency band in the idle state, allocate a remaining resource of the original uplink frequency band excluding a required resource for normal uplink transmission; and
when the shared frequency band comprises the original downlink frequency band in the idle state, allocate a remaining resource of the original downlink frequency band excluding a required resource for normal downlink transmission.

13. The device of claim 8, wherein the shared frequency band comprises an unlicensed public frequency spectrum resource.

14. The device of claim 13, wherein when the shared frequency band comprises the unlicensed public frequency spectrum resource, the memory includes further instructions to:
detect an interference with the unlicensed public frequency spectrum resource;
when the interference with the unlicensed public frequency spectrum resource is less than a preset interference threshold, allow the unlicensed public frequency spectrum resource to serve as the shared frequency band; and
when the interference with the unlicensed public frequency spectrum resource is greater than or equal to the preset interference threshold, not allow the unlicensed public frequency spectrum resource to serve as the shared frequency band.

15. A non-transitory computer-readable medium storing a set of instructions which when executed by a computer system using a processor become operational with the processor for resource allocation, the non-transitory computer-readable medium comprising instructions to:
determine a shared frequency band;
in accordance with a first resource demands for an original uplink frequency band and a second resource demands for an original downlink frequency band determined in a network service, allocate the shared frequency band to at least one of the original uplink frequency band and the original downlink frequency band; and
when the shared frequency band is simultaneously allocated to the original uplink frequency band and the original downlink frequency band, set protective time slots between uplink sub-frames and downlink sub-frames, wherein the uplink sub-frames and the downlink sub-frames are divided from the shared frequency band.

16. The non-transitory computer-readable medium of claim 15, comprising further instructions to:

when the shared frequency band is simultaneously allocated to the original uplink frequency band and the original downlink frequency band, set a protective isolation bandwidth between the original uplink frequency band allocated with the shared frequency band and the original downlink frequency band allocated with the shared frequency band.

17. The non-transitory computer-readable medium of claim 15, comprising further instructions to:
based on one of a preset frequency width and a time width, divide a shared bandwidth of the shared frequency band into a plurality of dispatched units; and
based on a proportion of the network service, allocate a first quantity of the dispatched units to the original uplink frequency band and a second quantity of the dispatched units to the original downlink frequency band.

18. The non-transitory computer-readable medium of claim 15, wherein the shared frequency band comprises one of a dedicated frequency band, the original uplink frequency band in an idle state, and the original downlink frequency band in an idle state.

19. The non-transitory computer-readable medium of claim 18, comprising further instructions to:
when the shared frequency band comprises the original uplink frequency band in the idle state, allocate a remaining resource of the original uplink frequency band excluding a required resource for normal uplink transmission; and
when the shared frequency band comprises the original downlink frequency band in the idle state, allocate a remaining resource of the original downlink frequency band excluding a required resource for normal downlink transmission.

20. The non-transitory computer-readable medium of claim 15, comprising further instructions to:
when the shared frequency band comprises an unlicensed public frequency spectrum resource, wherein the shared frequency band comprises the unlicensed public frequency spectrum resource:
detect an interference with the unlicensed public frequency spectrum resource, wherein the shared frequency band comprises the unlicensed public frequency spectrum resource;
when the interference with the unlicensed public frequency spectrum resource is less than a preset interference threshold, allow the unlicensed public frequency spectrum resource to serve as the shared frequency band; and
when the interference with the unlicensed public frequency spectrum resource is greater than or equal to the preset interference threshold, not allow the unlicensed public frequency spectrum resource to serve as the shared frequency band.

* * * * *